US012064988B1

(12) United States Patent
He et al.

(10) Patent No.: US 12,064,988 B1
(45) Date of Patent: Aug. 20, 2024

(54) CONNECTABLE MARKER PENS

(71) Applicant: SHENZHEN THOUSANDSHORES TECHNOLOGY CO., LTD., Guangdong (CN)

(72) Inventors: Ding He, Shenzhen (CN); Zhi Liu, Shenzhen (CN); Dengwu Wu, Shenzhen (CN)

(73) Assignee: SHENZHEN THOUSANDSHORES TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/505,080

(22) Filed: Nov. 8, 2023

(30) Foreign Application Priority Data

Oct. 27, 2023 (CN) ......................... 202322894598.0

(51) Int. Cl.
*B43K 23/06* (2006.01)
*B43K 23/12* (2006.01)

(52) U.S. Cl.
CPC .............. *B43K 23/06* (2013.01); *B43K 23/12* (2013.01)

(58) Field of Classification Search
CPC .... A63H 33/065; A63H 33/08; A63H 33/086; A63H 33/088; B43K 7/005; B43K 8/003; B43K 23/06
See application file for complete search history.

(56) References Cited

U.S. PATENT DOCUMENTS

| | | | | |
|---|---|---|---|---|
| 5,098,328 A * | 3/1992 | Beerens | A63H 33/08 | 446/128 |
| 6,276,855 B1 * | 8/2001 | Hsien | B43K 24/082 | 401/109 |
| 7,371,146 B2 * | 5/2008 | Scarborough | A63H 33/084 | 446/124 |
| 7,661,896 B2 * | 2/2010 | Zawitz | B43K 29/12 | 401/6 |
| 9,409,099 B2 * | 8/2016 | Sokolov | A63H 33/04 | |
| 9,858,827 B2 * | 1/2018 | Shirvani | G09B 1/36 | |
| 10,150,045 B2 * | 12/2018 | Dubreuil | A63H 33/062 | |
| 2013/0115849 A1 * | 5/2013 | Yap | A63H 33/08 | 446/128 |
| 2016/0310865 A1 * | 10/2016 | Won | B43K 23/06 | |
| 2019/0047759 A1 * | 2/2019 | Knapik | B65D 81/361 | |
| 2019/0192987 A1 * | 6/2019 | Wakim | A63H 33/08 | |

FOREIGN PATENT DOCUMENTS

| | | |
|---|---|---|
| CN | 201784308 U | 4/2011 |
| CN | 212889594 U | 4/2021 |
| CN | 212920914 U | 4/2021 |

(Continued)

OTHER PUBLICATIONS

KR-20120001785-U (Year: 2012).*

*Primary Examiner* — David P Angwin
*Assistant Examiner* — Bradley S Oliver
(74) *Attorney, Agent, or Firm* — Porus IP LLC

(57) ABSTRACT

The embodiments of the present disclosure provide a connectable marker pen, including a body and a pen cap; wherein the pen cap is provided on at least one end of the body; an exterior of the pen cap is provided with one or more protrusions, and the one or more protrusions include at least one first protrusion and at least one second protrusion; and both the first protrusion and the second protrusion are provided on at least one surface of the exterior of the pen cap.

20 Claims, 13 Drawing Sheets

(56) References Cited

FOREIGN PATENT DOCUMENTS

| | | | | |
|---|---|---|---|---|
| CN | 213138323 | U | | 5/2021 |
| CN | 113352801 | A | | 9/2021 |
| CN | 214928488 | U | | 11/2021 |
| CN | 215096603 | U | | 12/2021 |
| KR | 20120001785 | U | * | 3/2012 |

* cited by examiner

200

CONNECTABLE MARKER PENS

CROSS-REFERENCE TO RELATED APPLICATION

The application claims priority of Chinese Patent Application No. 202322894598.0, filed on Oct. 27, 2023, the entire contents of which are incorporated herein by reference.

TECHNICAL FIELD

The present disclosure relates to the field of stationery supplies, and in particular, to a dual-ended connectable block marker pen.

BACKGROUND

The design of conventional marker pens mainly focuses on the smoothness of writing and the comfort of holding, with functions generally limited to writing and drawing. In order to meet the diverse needs of users and enhance the appeal of marker pens, designs that incorporate additional usage functions have emerged, such as the use of pen cap structures for splicing to increase the added value of the marker pen. However, relying solely on the pen cap for splicing often has limitations and a single splicing manner, which affects the enjoyment of splicing.

Therefore, it is necessary to provide a connectable block marker pen to make the splicing of the marker pen more diverse and flexible, thus offering more versatility and functionality.

SUMMARY

According to one or more embodiments of the present disclosure, a connectable marker pen is provided, including a body and a pen cap; wherein the pen cap is provided on at least one end of the body; an exterior of the pen cap is provided with one or more protrusions, and the one or more protrusions include at least one first protrusion and at least one second protrusion; and the second protrusion has a groove that mates with the first protrusion; and top of the pen cop is provided with one or more protrusions, including at least one of the first protrusion and the second protrusion.

In some embodiments, a ratio between a height of the first protrusion and a depth of the groove is 0.5:1 to 1:1.

In some embodiments, the height of the first protrusion is 0.96 mm to 1.44 mm and a diameter of the first protrusion is 2.04 mm to 3.06 mm.

In some embodiments, a height of the second protrusion is 0.96 mm to 1.44 mm and a diameter of the second protrusion is 3.2 mm to 4.8 mm; and a diameter of the groove is 2.04 mm to 3.06 mm.

In some embodiments, the pen cap includes a top surface and four side surfaces; the top surface is provided with a first protrusion and a second protrusion; each of the four side surfaces is provided with a plurality of first protrusions and a plurality of second protrusions; and a count of protrusions is equal on the each of the four side surfaces, and a count of the first protrusions is equal to a count of the second protrusions In some embodiments, a distance between a center point of the first protrusion disposed on the top surface and a center point of the second protrusion disposed on the top surface is within a range of 4.8 mm to 7.2 mm.

In some embodiments, the first protrusion and the second protrusion disposed on the top surface are provided along a first symmetry axis of the top surface and are symmetrically distributed relative to a second symmetry axis, and the first symmetry axis is perpendicular to the second symmetry axis.

In some embodiments, for different side surfaces of the four side surfaces, arrangements of the plurality of protrusions are different, and each side surface of the four side surfaces exists another side surface where an arrangement mates with the each side surface of the four side surfaces.

In some embodiments, the plurality of protrusions are arranged in a dotted pattern, and a distance between center points of two adjacent protrusions is 4.8 mm to 7.2 mm.

In some embodiments, an edge of the top surface has a cylindrical protrusion.

In some embodiments, the pen cap is provided with a turntable, and the one or more protrusions are provided on the turntable.

In some embodiments, the one or more protrusions include at least three protrusions, the at least three protrusions have at least three extension directions, and the at least three extension directions include an x-axis direction, a y-axis direction, and a non-coordinate axial direction; and the x-axis direction refers to a direction that is perpendicular to an axial direction of the marker pen, the y-axis direction refers to a direction that is parallel to the axial direction of the marker pen, and the non-coordinate axis direction is not perpendicular to either the x-axis direction or the y-axis direction.

In some embodiments, at least one protrusion extending along the y-axis direction mates with at least one protrusion extending along the non-coordinate axial direction.

In some embodiments, at least one protrusion extending along the x-axis direction includes the first protrusion and the second protrusion, and the first protrusion and the second protrusion are disposed opposite to each other.

In some embodiments, a first elastic component is provided within the body to adjust a length of the body.

In some embodiments, the pen cap is provided with a limiting restriction structure and a second elastic component; the limiting structure is configured to control a state of the one or more protrusions; and when the limiting structure is in a non-limiting state, in response to the protrusions being subjected to an action of pressure, the protrusions moves along an axial direction of the protrusions under the action of the pressure and such that the second elastic component undergoes an elastic deformation.

In some embodiments, each of four side surfaces or a top surface include a first protrusion and a plurality of second protrusions, the second protrusions are evenly distributed around the first protrusions with the first protrusion as a center.

In some embodiments, the protrusions on either side surface or top surface include a first protrusion and a plurality of second protrusions, the plurality of second protrusions being centered on the first protrusion and evenly distributed around the first protrusion.

In some embodiments, the body is provided with a fixing slot.

In some embodiments, a middle of the fixing slot is hollowed out to form a storage space; and at least one marker pen is snap-connected through the fixing slot to form a continuous storage space.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
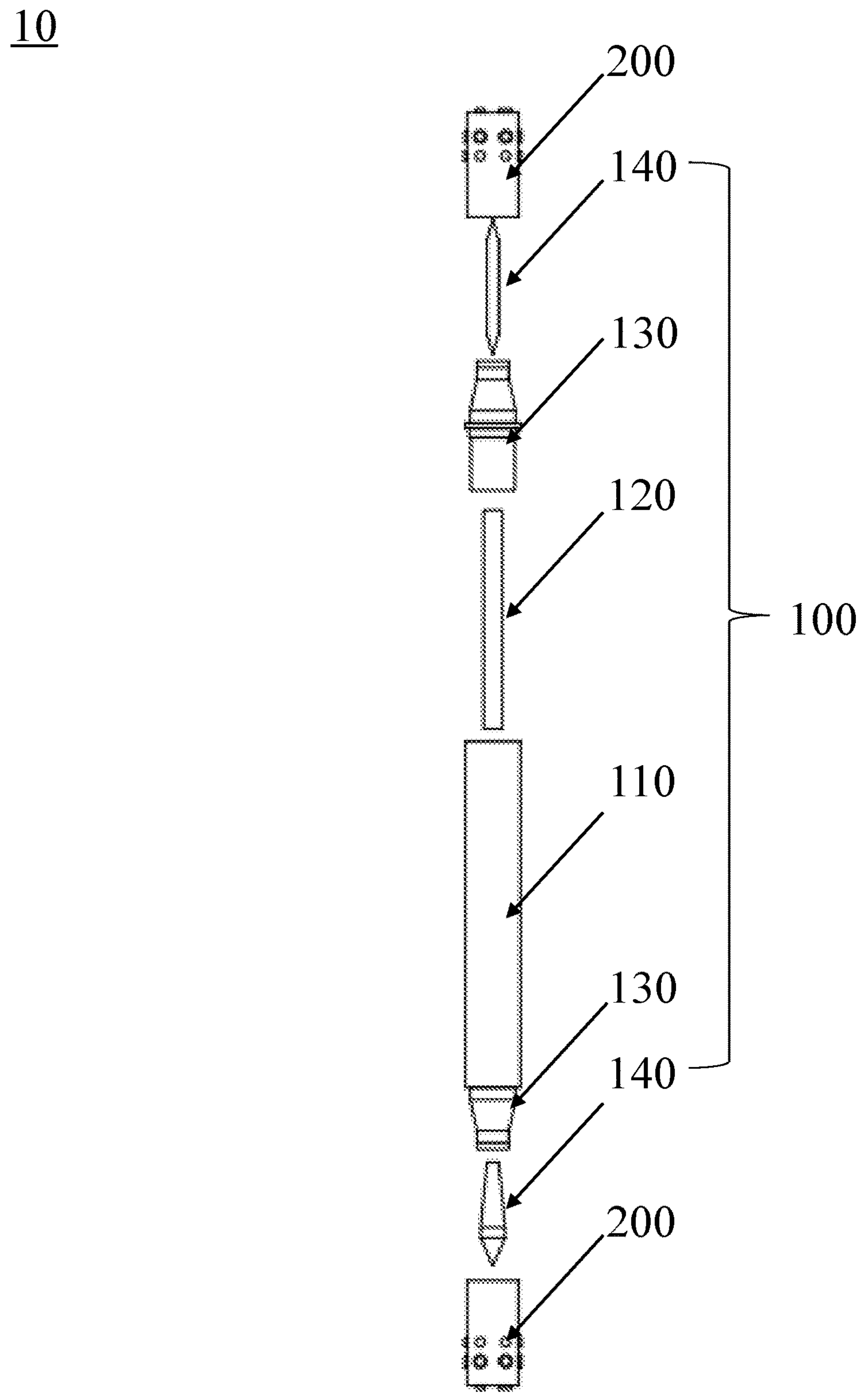
FIG. 1 is a schematic diagram illustrating a connectable marker pen according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise.

FIG. 1 is a schematic diagram illustrating a connectable marker pen according to some embodiments of the present disclosure.

As shown in FIG. 1, a marker pen 10 includes a body 100 and a pen cap 200. The pen cap 200 may be connected to the body 100.

The body 100 is a portion of the marker pen 10 configured to accomplish writing. In some embodiments, the body 100 may include at least a housing 110, a pen refill 120, a pen nib 130, a pen tip 140, or the like. The housing 110 is provided with one or more through-holes. The pen refill 120 is provided in the one or more through-holes of the housing 110, and ink may be stored in the pen refill 120. Two pen nibs 130 may be connected to each end of the one or more through-hole, and the pen tip 140 may pass through the pen nib 130 to be connected to the pen refill 120. The pen nib 140 may guide the ink stored within the pen refill 120 to flow outwardly.

The pen cap 200 is provided on at least one end of the body 100. For example, the marker pen 10 may be a dual-ended marker pen (as shown in FIG. 1), or a single-ended marker pen.

In some embodiments, an exterior of the pen cap 200 is provided with one or more protrusions, including at least one first protrusion and at least one second protrusion. The second protrusion has a groove that mates with the first protrusion. More description regarding the first protrusion and the second protrusion may be found in FIGS. 2 and 3, and their related descriptions.

In some embodiments, at least one surface of the exterior of the pen cap 200 is provided with both the first protrusion and the second protrusion to enable connections between different marker pens. For example, when the pen cap 200 is square, the pen cap 200 has five surfaces, including a top surface and four side surfaces, and at least one set of protrusions is provided on at least one surface of the pen cap, each set of protrusions includes one first protrusion and one second protrusion, the connections between different marker pens are realized through the first protrusion on one surface mating with the second protrusion on another marker pen, and/or through the second protrusion on one surface mating with the first protrusion on another marker pen. As another example, when the pen cap 200 is spherical or hemispherical, a spherical surface or a hemispherical surface of the pen cap 200 may be considered as a side surface having at least one set of protrusions, and the connections between different marker pens are realized by the first protrusion on the side surface mating with the second protrusion on another marker pen, and/or by the second protrusion on the side surface mating with the first protrusion on another marker pen. More descriptions regarding the principle of the first protrusion mating with the second protrusion may be found in FIG. 2 and the relevant description thereof.

Figure 2:
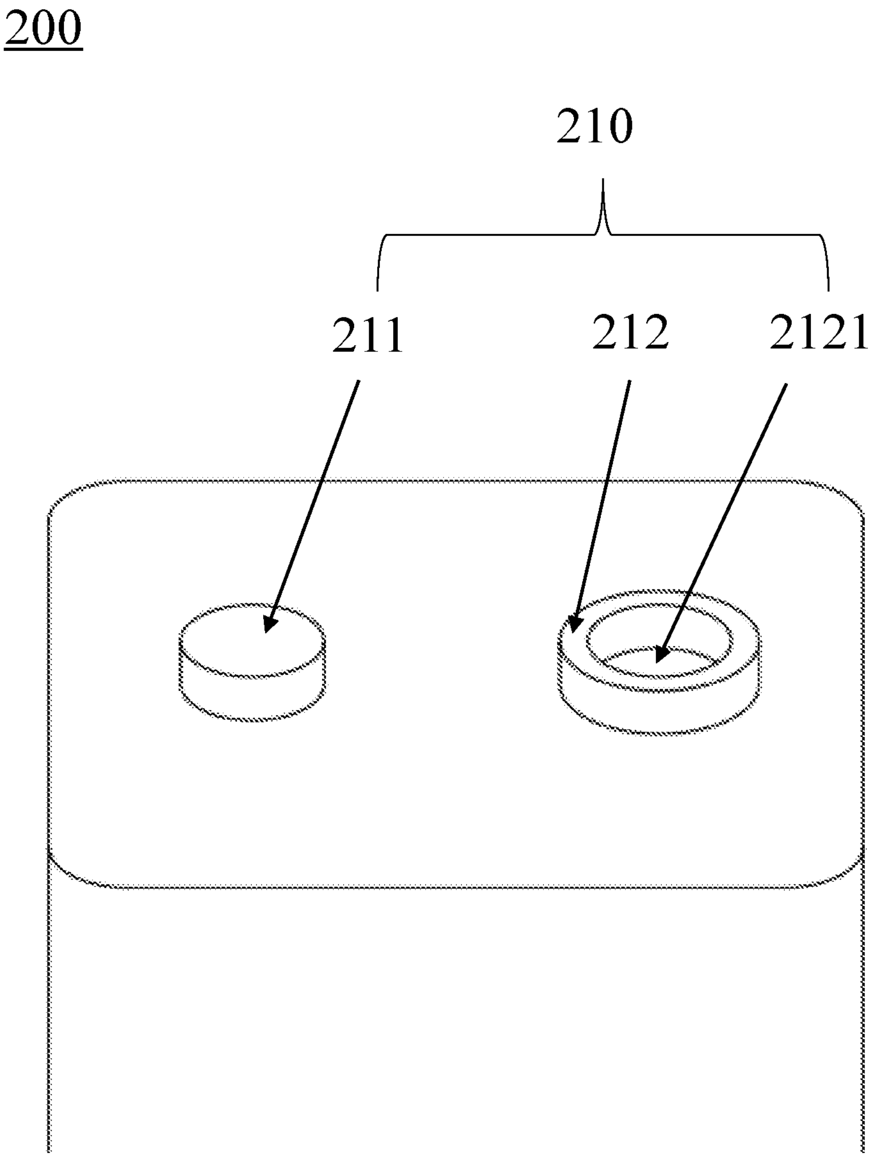
FIG. 2 is a schematic diagram illustrating a principle of mating between a first protrusion and a second protrusion according to some embodiments of the present disclosure.
Figure 3A:
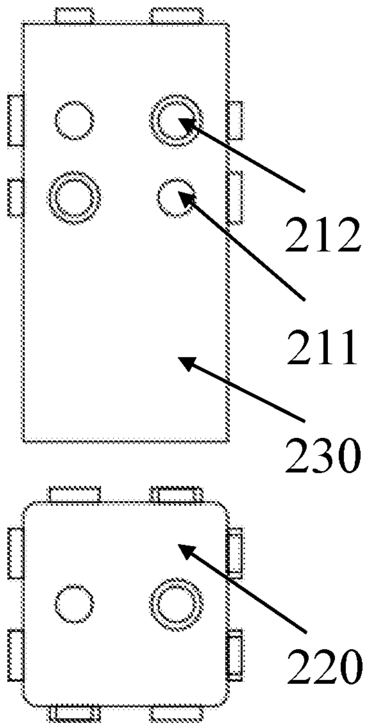
FIGS. 3A-3D are schematic diagrams illustrating different arrangements of protrusions on four side surfaces according to some embodiments of the present disclosure.
Figure 3B:
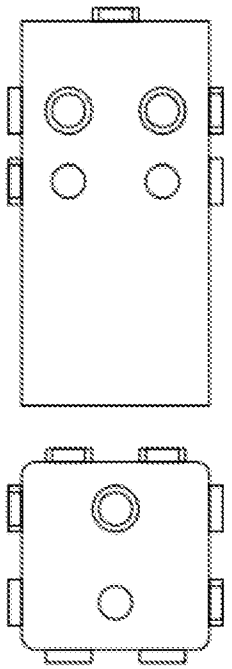
Figure 3C:
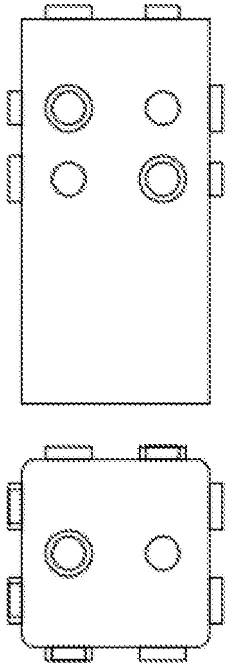
Figure 3D:
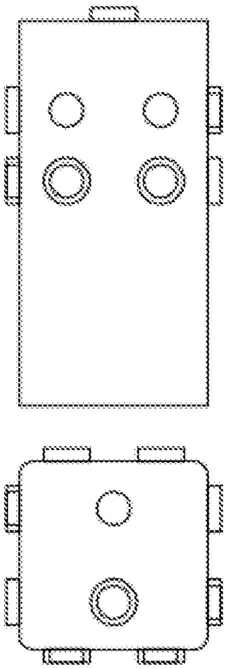

FIG. 2 is a schematic diagram illustrating a principle of mating between a first protrusion and a second protrusion according to some embodiments of the present disclosure. In some embodiments, as shown in FIG. 2, an exterior of the pen cap 200 is provided with one or more protrusions 210, including at least one first protrusion 211 and at least one second protrusion 212. In some embodiments, the second protrusion 212 may include a groove 2121 that mates with the first protrusion 211. The two pen caps 200 may be connected to each other through mating of the first protrusion 211 and the second protrusion 212.

In some embodiments, a height of the first protrusion 211 may be less than or equal to a height of the second protrusion 212. When the two pen caps 200 are connected, the first protrusion 211 may be completely installed into the groove 2121 of the second protrusion 212, and the second protrusion 212 may be affixed to a surface of another pen cap 200, which may enhance a connection strength and a resistance to twisting at the connection between the first protrusion 211 and the second protrusion 212.

In some embodiments, a ratio of the height of the first protrusion 211 to a depth of the groove 2121 may be 0.5:1 to 1:1. The closer the ratio is to 0.5:1, the easier the spliced structure of the first protrusion 211 and the second protrusion 212 is to be disassembled; and the closer the ratio is to 1:1, the more solid the spliced structure is.

In some embodiments, the height of the first protrusion 211 may be 0.96 mm to 1.44 mm and a diameter of the first protrusion 211 may be 2.04 mm to 3.06 mm.

In some embodiments, the height of the second protrusion 212 may be 0.96 mm to 1.44 mm and a diameter of the second protrusion 212 may be 3.2 mm to 4.8 mm. A diameter of the groove 2121 may be 2.04 mm to 3.06 mm.

In some embodiments, the diameter of the groove 2121 may be set based on the diameter of the first protrusion 211. For example, the diameter of the groove 2121 may be the same as the diameter of the first protrusion 211.

In some embodiments, the first protrusion 211 and the groove 2121 may mate by an interference fit.

In some embodiments, the one or more protrusions 210 may be made of a material that has a certain elasticity, for example, soft rubber, polyurethane elastomers, polyester elastomers, silicone, and other materials that are soft and provide a comfortable grip. By using the above materials, the at least one first protrusion 211 and the at least one second protrusion 212 may be made to have a certain elasticity, and when the at least one first protrusion 211 has an interference fit with the groove 2121, the connection strength of the at least one first protrusion 211 and the at least one second protrusion 212 may be increased. And the use of the material that has the elasticity may increase the friction between the at least one first protrusion 211 and the at least one second protrusion 212, and increase the connection strength of the first protrusion 211 and the second protrusion 212.

In some embodiments of the present disclosure, by providing the at least one first protrusion 211 and the at least one second protrusion 212, a stability of the marker pen may be greater when the marker pen is spliced, so that a structure formed after the marker pens are spliced together is more stable and less likely to be deformed.

FIGS. 3A-3D are schematic diagrams illustrating different arrangements of protrusions on four side surfaces according to some embodiments of the present disclosure.

As shown in FIGS. 3A-3D, in some embodiments, the pen cap 200 may include a top surface 220 and four side surfaces 230.

The top surface 220 is a surface disposed at an end of the pen cap 200. In some embodiments, the top surface 220 may be provided with one first protrusion 211 and one second protrusion 212. In some embodiments, the top surface 220 may be perpendicular to a lengthwise direction of the body 100.

The four side surfaces 230 are surfaces that surround a circumference of the top surface 220. In some embodiments, each of the four side surfaces 230 may be provided with a plurality of first protrusions 211 and a plurality of second protrusions 212.

In some embodiments, each of the four side surfaces 230 may be parallel to the lengthwise direction of the body 100 (i.e., an axial direction of the marker pen).

In some embodiments, two adjacent side surfaces 230 may be perpendicular to each other. In some embodiments, the two adjacent side surfaces 230 may use a rounded transition. In some embodiments, rounded transitions may be also used between the top surface 220 and the four side surfaces 230, thereby avoiding forming sharp protrusions 210 which may cause harm to users. In some embodiments, the two pen caps 200 may be connected by mating between the at least one protrusion on the side surface 230 of one pen cap 220 and the at least one protrusion on the side surface 230 of another pen cap 220, or by mating between the at least one protrusion on the side surface 230 of one pen cap 220 and the at least one protrusion on the top surface 220 of another pen cap 220, and the at least one protrusion includes the at least one first protrusion 211 and the at least one second protrusion 212.

In some embodiments, a count of protrusions on the each of the four side surfaces is equal, and a count of the first protrusions is equal to a count of the second protrusions.

In some embodiments, the two pen caps 200 may realize a connection between surface and surface through the one or more protrusions 210. For example, a connection between two top surfaces is realized by mating between the first protrusion 211 and the second protrusion 212 on the top surfaces 220, a connection between the top surface and each of the four side surfaces is realized by mating between the first protrusions 211 and the second protrusions 212 on the top surface 220 and the each of the four side surfaces 230, a connection between two side surfaces is realized by the mating between the at least one first protrusion 211 and the at least one second protrusion 212 on the two side surfaces, or the like.

In some embodiments, a distance between a center point of the first protrusion 211 located on the top surface 220 and a center point of the second protrusion 212 located on the top surface 220 is within a range of 4.8 mm to 7.2 mm.

In some embodiments of the present disclosure, by keeping a sufficient distance between the first protrusion 211 and the second protrusion 212, it is possible to avoid that when the top surfaces of the two pen caps 200 are connected, the first protrusion 211 and/or the second protrusion 212 on the different pen caps interfere with each other and affect the connection of the two pen caps 200.

In some embodiments, the first protrusion 211 and the second protrusion 212 on the top surface 220 are disposed along a first symmetry axis of the top surface 220 and are symmetrically distributed relative to the second symmetry axis. The first symmetry axis is perpendicular to the second symmetry axis. When two pen caps 200 mate with and are connected to each other by the first protrusion 211 and the second protrusion 212 on top surfaces 220 of the two pen caps, the two pen caps 200 may be aligned with each other.

In some embodiments, for different side surfaces 230 of the four side surfaces 230, arrangements of the plurality of protrusions 210 are different. For each side surface of the four side surfaces, there exists another side surface 230 with an arrangement mating with the each side surface 230 on another identical pen cap 200.

Through the above arrangement, a batch of pen caps 200 may be facilitated to be processed, so that batch-processed pen caps 200 may be interconnected according to a variety of forms as needed, and an adaptability of the pen caps 200 is improved.

In some embodiments, the plurality of protrusions 210 are arranged in a dotted pattern, and a distance between center points of two adjacent protrusions in a vertical direction or a horizontal direction is 4.8 mm to 7.2 mm.

In some embodiments of the present disclosure, by keeping the protrusions 210 at an appropriate distance from each other, the protrusions on different pen caps may be avoided interfering with each other and affecting the connection of the two pen caps 200 when the side surfaces of the two pen caps 200 are connected, and at the same time, unused protrusions are capable of being obscured by cylindrical protrusions 221 on the top surface 200. More description regarding the cylindrical protrusions 221 may be found in FIG. 4 and the related descriptions thereof.

In some embodiments, each of the four side surfaces 230 of the pen cap 200 may have four protrusions 210, and the four protrusions are distributed in two rows and two columns. FIGS. 3A, 3B, 3C, and 3D illustrate different arrangements of protrusions on the four side surfaces (i.e., side surfaces A, B, C, and D) of the pen cap 200, wherein side surface A and side surface C may mate with another side surface of the pen cap that has same arrangements of protrusions, side surface B may mate with a side surface of another pen cap that has the same arrangements of protrusions as the D side surface, and the top side surface 220 may mate with any one of the four side surfaces. In some embodiments, each of the four side surfaces 230 may also have other count of protrusions, a specific count and arrangements of the plurality of protrusions may be set according to actual needs.

In some embodiments, the plurality of protrusions 210 may also be distributed in other patterns. For example, the plurality of protrusions 210 may be distributed in a straight line, such as the first protrusion 211 is spaced apart from the plurality of second protrusions 212 in a straight line. As another example, the plurality of protrusions 210 may be distributed in a ring shape, such as, the plurality of second protrusions 212 are evenly distributed around the first protrusion 211 with the first protrusion 211 as a center, or the plurality of protrusions 210 may be distributed in a ring shape, or the plurality of first protrusions 211 are evenly distributed around the second protrusions 212 with the second protrusion 212 as a center. The specifics may be set according to actual needs.

Figure 4:
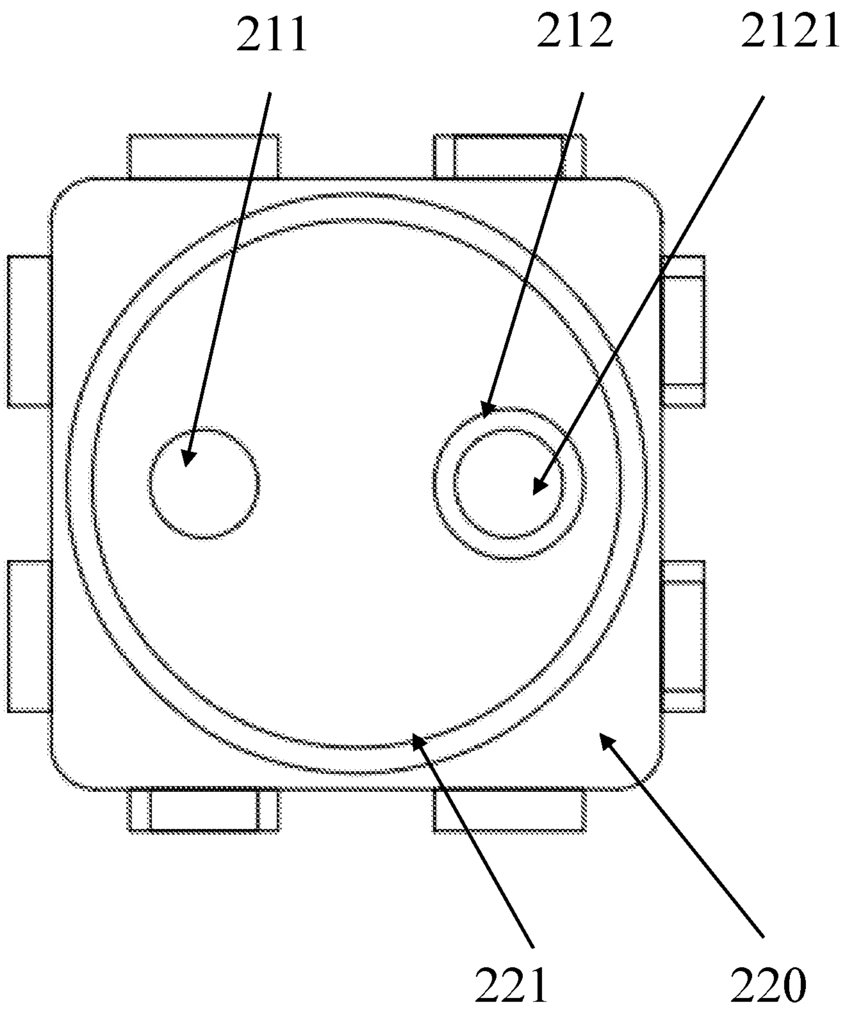
FIG. 4 is a schematic diagram illustrating a cylindrical protrusion according to some embodiments of the present disclosure.
Figure 13:
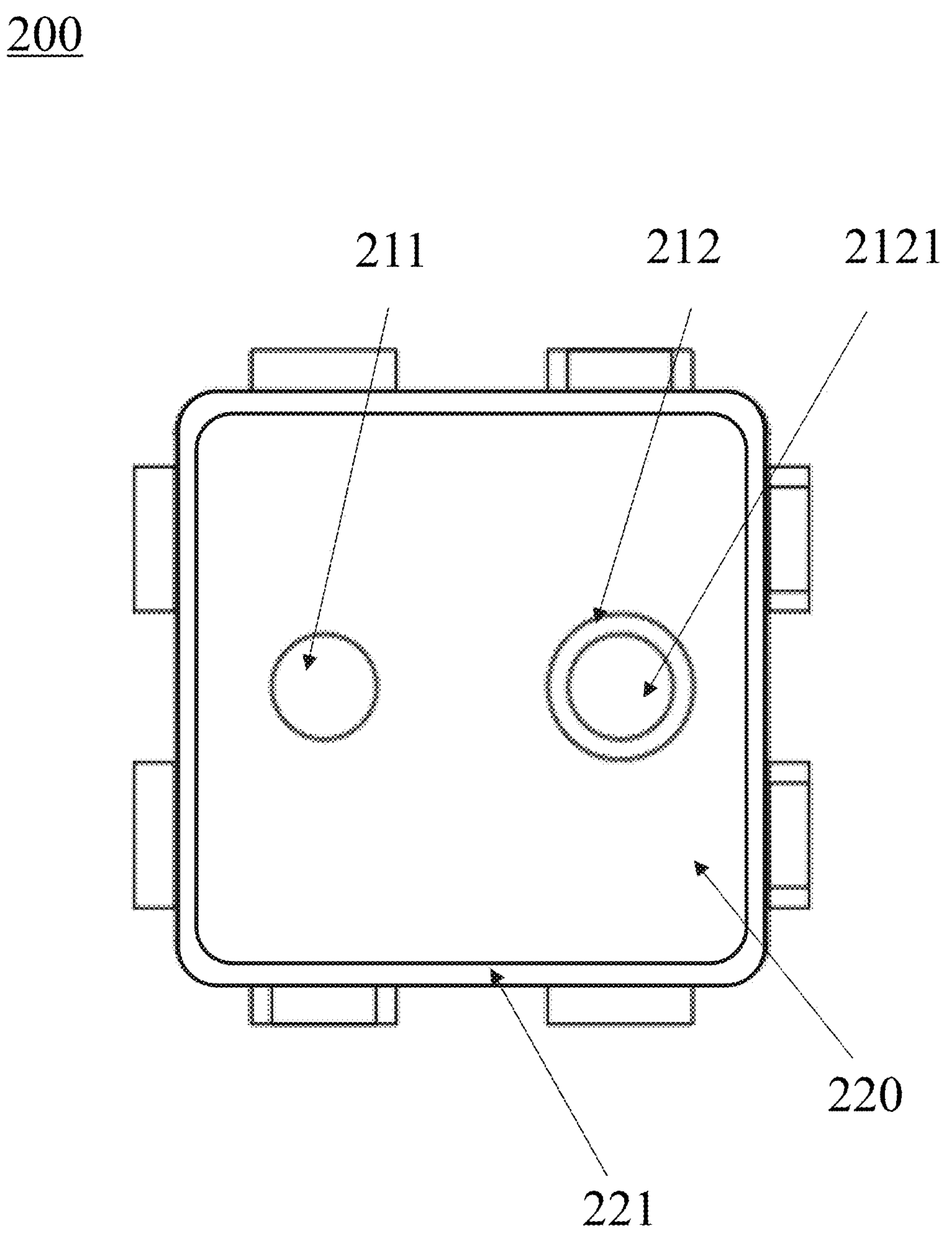
FIG. 13 is a schematic diagram illustrating a cylindrical protrusion according to some embodiments of the present disclosure.

FIG. 4 is a schematic diagram illustrating a cylindrical protrusion according to some embodiments of the present disclosure. FIG. 13 is a schematic diagram illustrating a cylindrical protrusion according to some embodiments of the present disclosure.

As shown in FIG. 4 and FIG. 13, in some embodiments, an edge of the top surface 220 of the pen cap has a cylindrical protrusion 221.

The cylindrical protrusion 221 is a protruding structure with a ring shape provided on the top surface 220. In some embodiments, the cylindrical protrusion 221 may be adapted to fit the edge shape of the top surface 220 (as shown in FIG. 13). For example, where the edge shape of the top surface 220 is circular, an outer side surface of the cylindrical protrusion 221 is circular. As another example, when the edge shape of the top surface 220 is rectangular, the outer side surface of the cylindrical protrusion 221 is rectangular (as shown in FIG. 13). In some embodiments, the outer side surface of the cylindrical protrusion 221 and the edge shape of the top surface 220 may be different (as shown in FIG. 4). For example, when the edge shape of the top surface 220 is rectangular, the outer side surface of the cylindrical protrusion 221 is circular.

In some embodiments, the distance between the outer side surface of the cylindrical protrusion 221 and the edge of the top surface 220 may be greater than 0 (as shown in FIG. 4) or equal to 0 (as shown in FIG. 13). When two pen caps 200 are connected to each other by the protrusions 210 on the respective top surface 220, the cylindrical protrusion 221 may shield and protect the protrusions 210, and the cylindrical protrusion 221 may fill in the gap between the two pen caps 200 to avoid a relative rotation of the two pen caps 200.

In some embodiments, for two pen caps 200 that may be connected to each other, the cylindrical protrusion 221 may be provided on one of the pen caps 200. A height of the cylindrical protrusion 221 may be the same as the height of the second protrusion 212.

In some embodiments, for two pen caps 200 that may be connected to each other, the cylindrical protrusion 221 may be provided on the two pen caps 200. The height of the cylindrical protrusion 221 may be one-half the height of the second protrusion 212.

Figure 5:
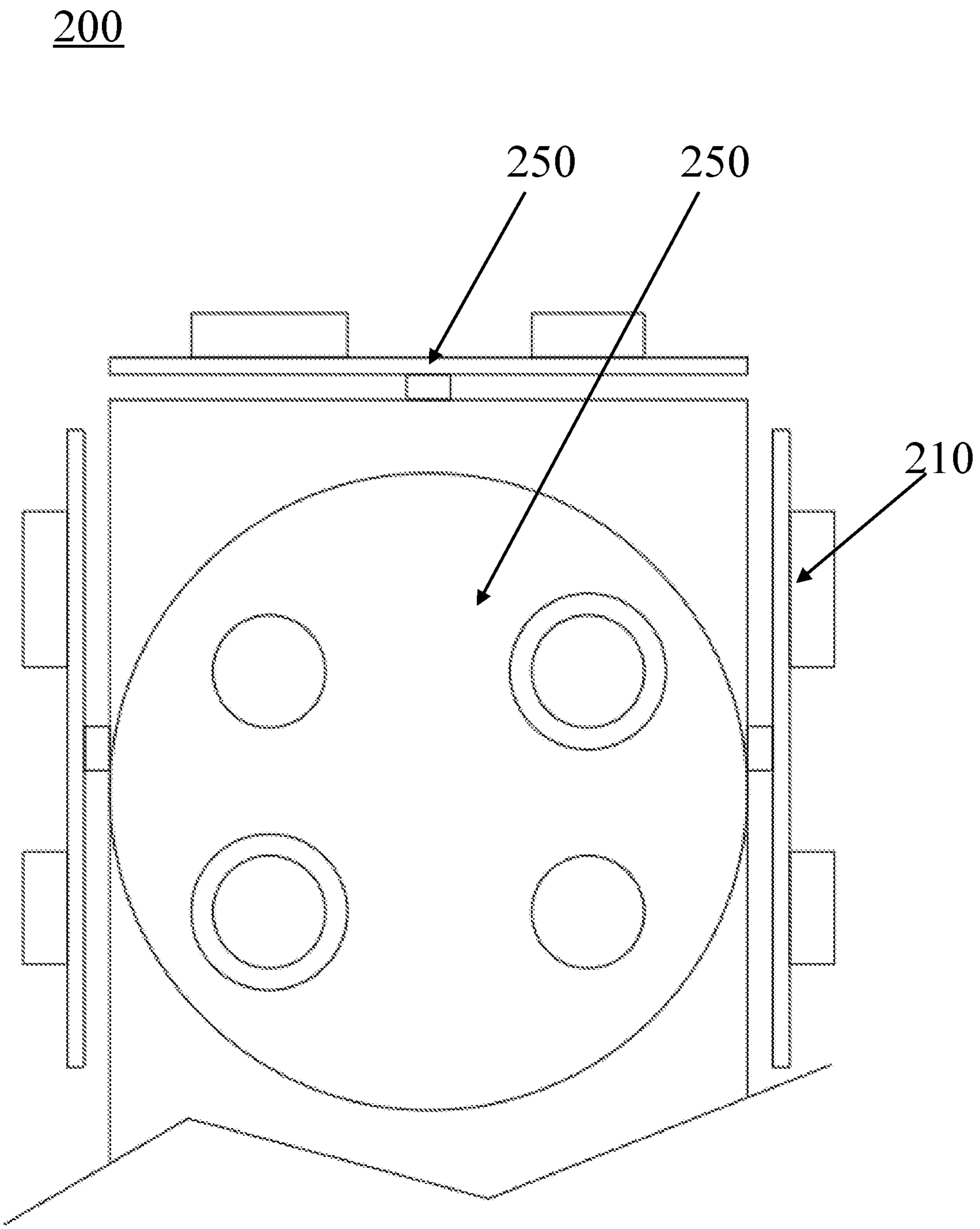
FIG. 5 is a schematic diagram illustrating a structure of a turntable according to some embodiments of the present disclosure.

FIG. 5 is a schematic diagram illustrating a structure of a turntable according to some embodiments of the present disclosure.

As shown in FIG. 5, in some embodiments, the pen cap 200 is provided with a turntable 250, and the one or more protrusions 210 may be provided on the turntable 250.

The turntable 250 refers to a rotatably disk-shaped structure. In some embodiments, the turntable 250 is rotatably connected to the top surface 220 and/or each of the four side surfaces 230 of the pen cap 200.

By providing the one or more protrusions 210 on the turntable 250, when rotating, the turntable 250 may drive the one or more protrusions 210 to rotate synchronously. When two pen caps 200 are connected to each other by the one or more protrusions 210 on the turntable 250, an angle between the two pen caps 200 may be adjusted.

In some embodiments, the turntable 250 is provided with one or more protrusions 210. In some embodiments, the plurality of protrusions 210 may be distributed in an array on the turntable 250. For example, the plurality of protrusions 210 may be distributed in at least one of a point array, a circular array, a linear array, or the like.

In some embodiments, the turntable 250 may be connected to the pen cap 200 by a damping structure. Under an action of an external force, the turntable 250 and the pen cap 200 may rotate relative to each other, and after a withdrawal of the external force, the turntable 250 and the pen cap 200 may remain fixed relative to each other under the action of the damping structure.

In some embodiments, the turntable 250 may be provided with the cylindrical protrusion 221.

In some embodiments, the turntable 250 may be connected to the pen cap 200 in a variety of patterns, e.g., clamping connection, threaded connection, etc. A connected turntable 250 may achieve a clockwise rotation or a counterclockwise rotation with a connection point as an axis.

By setting the plurality of protrusions on the turntable, the position of the plurality of protrusions may be adjusted, so that after the marker pen is spliced, the angle between different marker pens realizes a flexible adjustment, which enhances a flexibility of marker pen when splicing.

Figure 6:
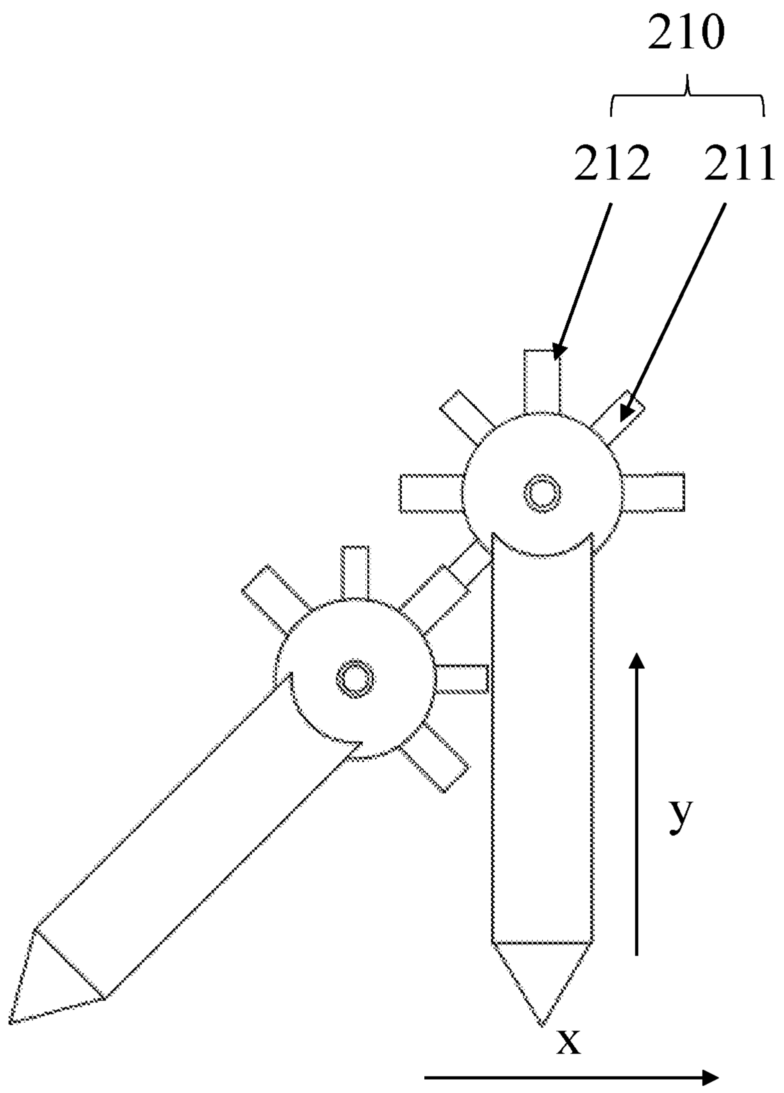
FIG. 6 is a schematic diagram illustrating an arrangement of protrusions according to another embodiment of the present disclosure.

FIG. 6 is a schematic diagram illustrating an arrangement of protrusions according to another embodiment of the present disclosure.

As shown in FIG. 6, in some embodiments, the one or more protrusions 210 include at least three protrusions, the at least three protrusions have at least three extension directions, and the at least three extension directions include an x-axis direction, a y-axis direction, and a non-coordinate axial direction.

The x-axis direction refers to a direction that is perpendicular to the axial direction of the marker pen, the y-axis direction refers to a direction that is parallel to the axial direction of the marker pen, and the non-coordinate axis direction is not perpendicular to either the x-axis direction or the y-axis direction.

In some embodiments, the pen cap 200 may include at least a portion of a spherical surface. A portion of the spherical surface of the pen cap 200 may be provided with the plurality of protrusions 210. The plurality of protrusions 210 may be provided in a radial direction along the spherical surface. In some embodiments, the plurality of protrusions 210 may be evenly arranged on the spherical surface.

In some embodiments, at least one protrusion extending along the y-axis direction may mate with at least one protrusion extending along the non-coordinate axial direction.

In some embodiments, at least two marker pens may be connected based on the above structure, thereby realizing drawing of different curves with one marker pen as an axis and at least one marker pen as a drawing pen. For example, the protrusion extending along the y-axis direction of the marker pen as the drawing pen is connected to the protrusion extending along the non-coordinate axial direction of the marker pen as the axis, so that an angle is formed between the two protrusions, the marker pen as the axis is perpendicular to a paper surface, and the marker pen as the drawing pen may draw a curve or a circle with another marker pen as a center of the circle on the paper surface.

In some embodiments, a radius of the curve or the circle that is drawn may be changed by splicing the protrusions at different positions.

Figure 7:
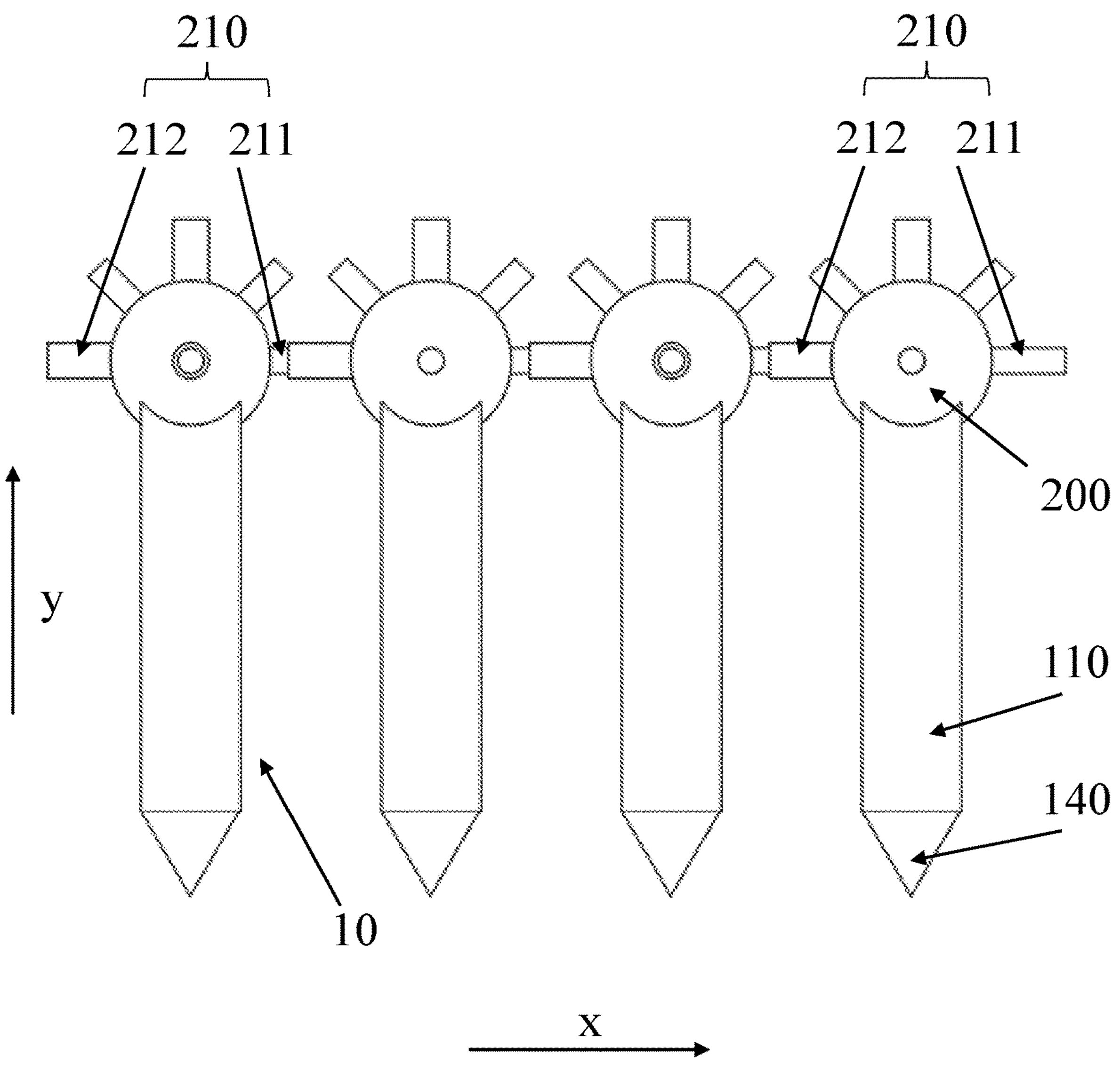
FIG. 7 is a schematic diagram illustrating a connection process of a marker pen according to some embodiments of the present disclosure.

FIG. 7 is a schematic diagram illustrating a connection process of a marker pen according to some embodiments of the present disclosure.

As shown in FIG. 7, in some embodiments, at least one protrusion extending along the x-axis direction includes a first protrusion 211 and a second protrusion 212, and the first protrusion 211 and the second protrusion 212 are disposed backwardly.

In some embodiments, a plurality of marker pens may be connected to each other by the plurality of first protrusions 211 and the plurality of second protrusions 212 provided backwardly along the x-axis direction. At least one curve may be drawn with any one of the plurality of marker pens as an axis and another marker pen as the drawing pen.

In some embodiments of the present disclosure, by providing different protrusions with different extension directions, the at least two marker pens may form different angles when connected by the protrusions with different extension directions, realizing a combination of the plurality of marker pens for drawing, and enhancing an interestingness of the use of the marker pen.

Figure 8:
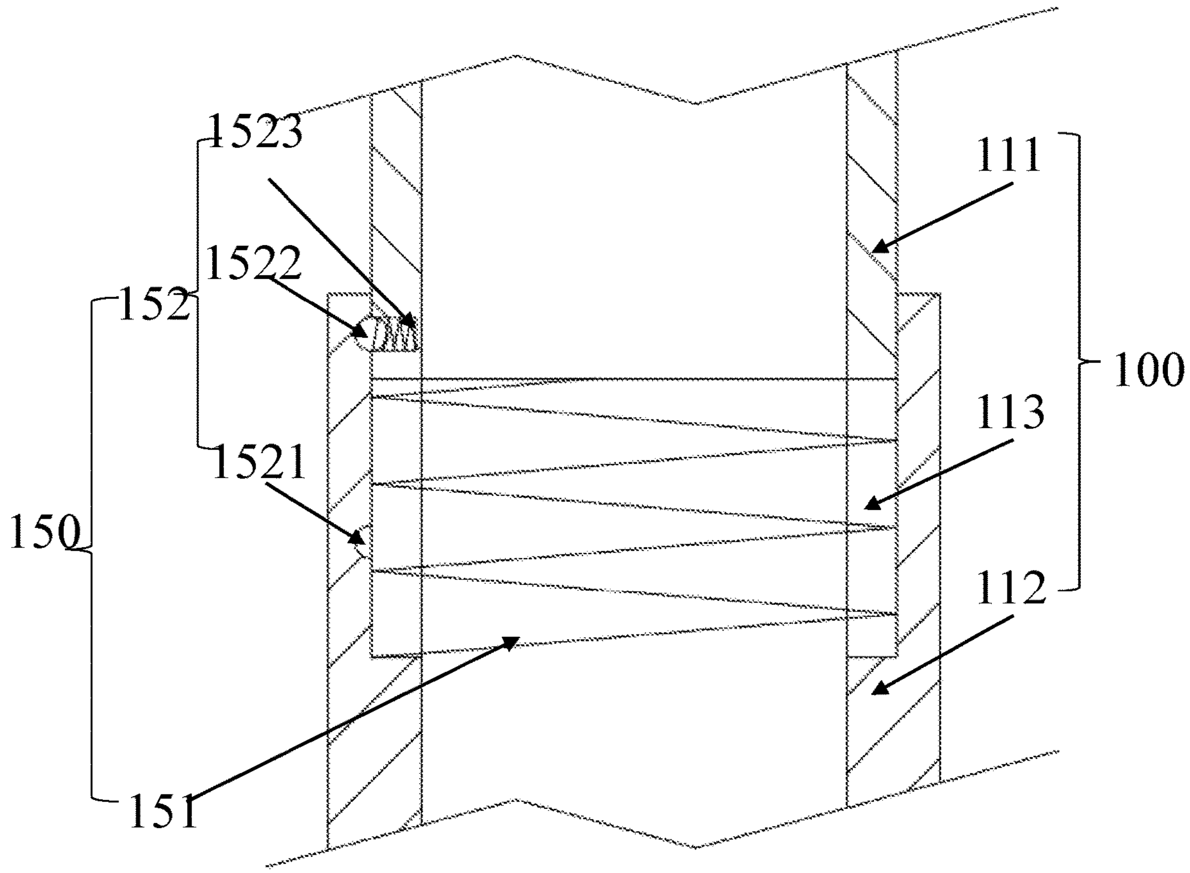
FIG. 8 is a schematic diagram illustrating a structure of a first elastic component according to some embodiments of the present disclosure.

FIG. 8 is a schematic diagram illustrating a structure of a first elastic component according to some embodiments of the present disclosure.

As shown in FIG. 8, in some embodiments, a first elastic component 150 is provided within the body 100. The length of the body 100 may be adjusted by the first elastic component 150.

The first elastic component 150 refers to a connecting structure having elasticity, and the first elastic component 150 may be configured to elastically connect at least two other structures, so that the two other structures may move relative to each other.

In some embodiments, the housing 110 of the body 100 may include a first housing 111 and a second housing 112, and the first housing 111 and the second housing 112 may be connected by the first elastic component 150. The first housing 111 and the second housing 112 may move relative to each other, thereby changing the length of the body 100.

In some embodiments, a slide groove 113 is provided within the second housing 112, and the first housing 111 is slidably provided within the slide groove 113. The first elastic component 150 may be provided within the slide groove 113, and the first elastic component 150 may be connected to the first housing 111 and the second housing 112, respectively.

In some embodiments, the user may use an external force to squeeze the first housing 111 inwardly to the slide groove 113, and the first elastic component 150 is subjected to a pressure that decreases the length of the body 100. In some embodiments, the user may use the external force to pull the first housing 111 outwardly from the slide groove 113, and the first elastic component 150 is subjected to a pulling force that may increase the length of the body 100. In some embodiments, the first elastic component 150 may include an elastic structure 151. One end of the elastic structure 151 is connected to the first housing 111, and another end of the elastic structure 151 is connected to the second housing 112. In some embodiments, the elastic structure 151 may use a spring.

In some embodiments, the first elastic component 150 may also include a locking structure 152. When the first housing 111 and the second housing 112 are in at least one preset relative position, the locking structure 152 may lock the first housing 111 and the second housing 112 to avoid further relative movement between the first housing 111 and the second housing 112. In some embodiments, the locking structure 152 may include at least two locking holes 1521 disposed on an inner side wall of the slide groove 113 and at least one locking bead 1522 disposed on the outer side wall of the first housing 111. The locking bead 1522 is elastically connected to the first housing 111. When the user uses the external force to cause the first housing 111 and the second housing 112 to move relative to each other until the at least one locking bead 1522 is aligned with the at least two locking holes 1521, the at least one locking bead 1522 may enter into the at least two locking holes 1521, and after the user withdraws the external force, the at least one locking bead 1522 may lock the first housing 111 and the second housing 112. In some embodiments, the plurality of locking holes 1521 may be disposed along a lengthwise direction of the second housing 112 on the inner sidewall of the slide groove 113. In some embodiments, the plurality of locking holes 1521 may be provided in one or more rows along the lengthwise direction of the second housing 112. In some embodiments, the locking bead 1522 may be one of spherical, hemispherical, cylindrical, prismatic, etc. In some embodiments, the shapes of the locking holes 1521 may fit the locking bead 1522. In some embodiments, the locking bead 1522 and the first housing 111 may be elastically connected in a variety of patterns. For example, a locking spring 1523 is provided within the first housing 111 and the locking bead 1522 is connected to the locking spring 1523. In some embodiments, the first housing 111 and the second housing 112 may rotate relative to each other around the axis of the body 100.

Figure 9:
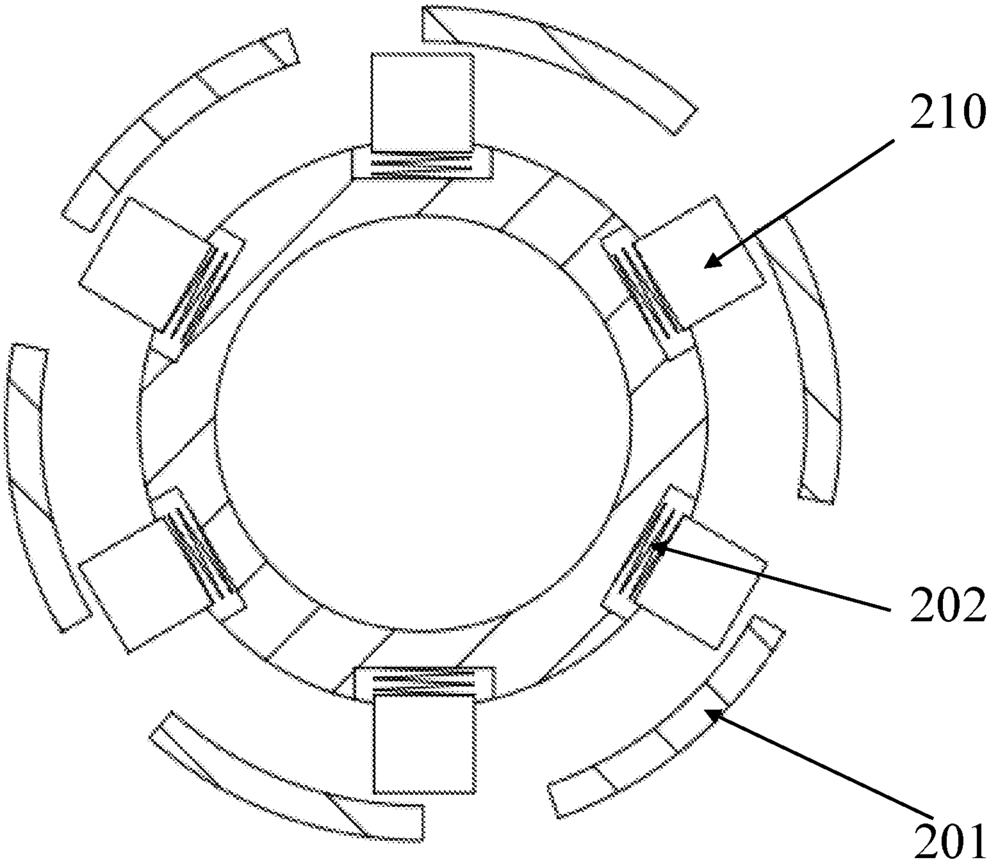
FIG. 9 is a schematic diagram illustrating an internal structure of a pen cap of a dual-ended connectable marker pen according to some embodiments of the present disclosure.

FIG. 9 is a schematic diagram illustrating an internal structure of a pen cap of a dual-ended connectable marker pen according to some embodiments of the present disclosure.

As shown in FIG. 9, in some embodiments, a limiting structure 201 and a second elastic component 202 may be provided within the pen cap of the dual-ended connectable marker pen.

The limiting structure 201 refers to a structure for limiting or controlling the state of the protrusions. In some embodiments, the limiting structure 201 may be a structure including a sliding member. The limiting structure 201 is capable of switching between two or more positions. The limiting structure 201 may be configured to lock or release the protrusion and to ensure stability of the protrusion when used in a splice and an in-situ reset of the protrusion in a non-use state.

In some embodiments, the state of the limiting structure may include a limited state and an unlimited state.

The limiting state is a state in which the limiting structure is open. In some embodiments, when the limiting structure 201 is in the limiting state, the limiting structure 201 may limit a movement of the protrusion 210 along the axial direction of the protrusion, so that the protrusion 210 may not be displaced.

The non-limiting state refers to that the limiting structure is in a closed state. In some embodiments, when the limiting structure is in a non-limiting state, in response to the protrusions 210 being subjected to an action of pressure, the protrusions 210 move along the axial direction of the protrusions under the action of the pressure and such that the second elastic component 202 then undergoes an elastic deformation. The direction of the elastic deformation of the second elastic component is consistent with the axial direction of the protrusions.

As shown in FIG. 9, in some embodiments, the limiting structure 201 may be provided at a periphery of the pen cap by nesting. The limiting structure 201 may rotate clockwise or counterclockwise to change the limiting state of the limiting structure 201 with the same axis as the pen cap 200.

In some embodiments, the limiting structure 201 may also be provided in other ways. For example, the limiting structure 201 may be designed as a sliding type or push-button type to control the state (on or off) of a switch by sliding up/down or pressing.

The second elastic component 202 is a component for controlling the protrusions 210 to extend or retract outwardly into the interior of the pen cap. In some embodiments, one end of the second elastic component 202 may be fixed to the inner sidewall of the pen cap 200, and another end is connected to the protrusions 210, and the protrusions are caused to move along a prescribed trajectory with the pressure under the action of the second elastic component through a designed guiding mechanism. The guiding mechanism may be realized by a guide rail, a slot, or other constraints.

In some embodiments, the second elastic structure 201 may provide a reverse force when the protrusions 210 are subjected to the external pressure. For example, when the protrusions 210 are subjected to an external pressure, the second elastic component 201 is compressed. When the pressure is released, the second elastic component 201 pushes the protrusions 210 back to initial positions of the protrusions 210.

In some embodiments, the second elastic component may undergo the elastic deformation when the protrusions receive the action of the pressure when the limiting structure is in the non-limiting state.

In some embodiments, the structure or the shape of the second elastic component may be determined based on designs of the protrusions and the amount of elasticity required.

In some embodiments, the second elastic component may include an elastic component such as the spring.

In some embodiments of the present disclosure, by the limiting structure and the second elastic structure within the pen cap of the marker pen cooperating in conjunction, unconnected protrusions may be retracted to keep the surface of the pen cap flat, and by limiting the movement of the protrusions through the limiting structure, the protrusions may be avoided from touching the protrusions inadvertently, which improves the flexibility and practicability of the use of the marker pen.

Figure 10:
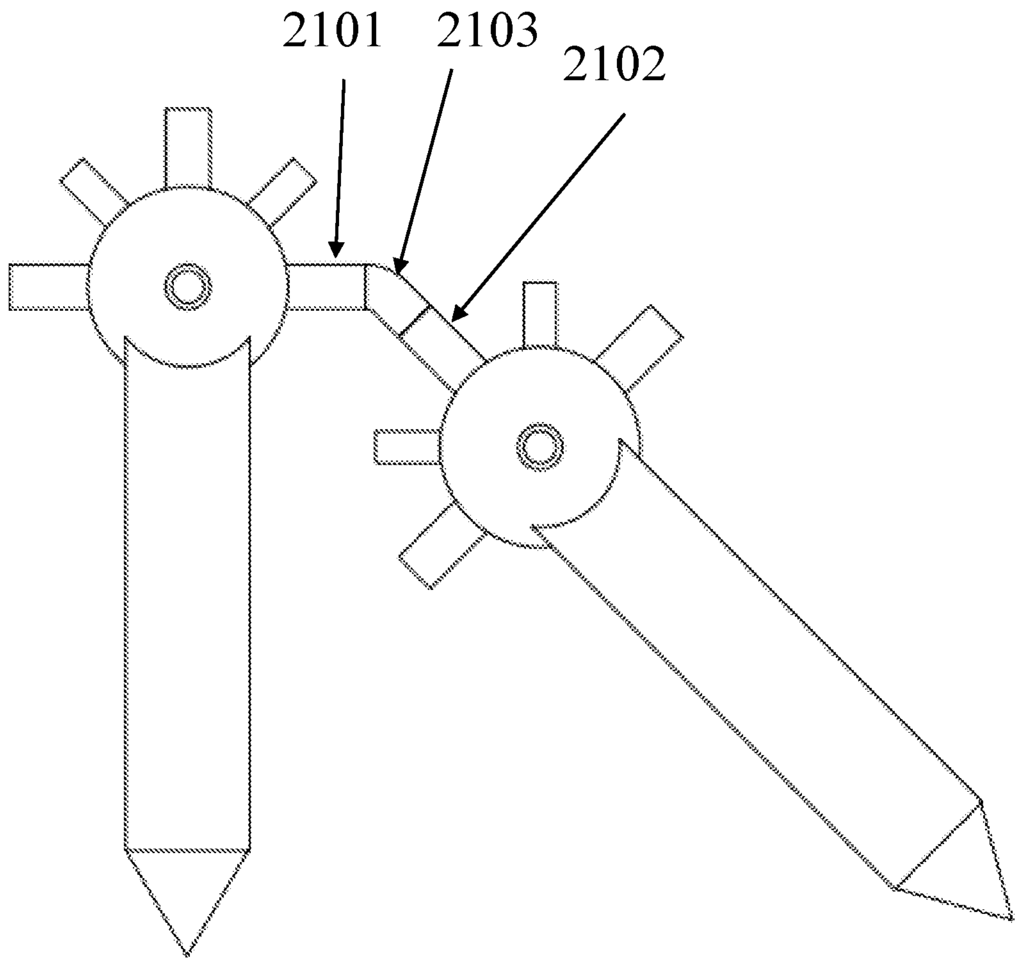
FIG. 10 is a schematic diagram illustrating a turning structure according to some embodiments of the present disclosure.

FIG. 10 is a schematic diagram illustrating a turning structure according to some embodiments of the present disclosure.

As shown in FIG. 10, in some embodiments, the protrusion 210 of the marker pen may include a first extension section 2101, a second extension section 2102, and a turning structure 2103. The first extension section 2101 and the second extension section 2102 are rotationally connected by the turning structure 2103, and the extension direction of the first extension section 2101 and extension direction of the second extension section 2102 are different.

The first extension section 2101 is a section of the protrusion 210 that has extended properties. In some embodiments, the first extension section 2101 may be a portion of the protrusion 210 that is connected to the pen cap 200.

The second extension section 2102 refers to a structure in which another section of the one or more protrusions 210 has an extension characteristic, and the extension direction of the second extension 2102 and the extension direction of the first extension 2101 are different. In some embodiments, the second extension 2102 may be a portion of the protrusions 210 that is connected to another protrusion.

In some embodiments, the first extension 2101 and the second extension 2102 may be connected by the turning structure 2103.

The turning structure 2103 is a structure that connects the first extension 2101 and the second extension 2102. In some embodiments, the turning structure 2103 may include a component capable of performing a relative rotation along at least one axis. For example, the component may be a rotation joint, etc.

In some embodiments, the one or more first protrusions 211 may include a spherical structure and a connecting member, and the connecting member may be configured to connect the spherical structure to the pen cap. The groove in the second protrusion 212 mates with the spherical structure.

In some embodiments, the connecting member is configured to connect the spherical structure to the pen cap, and the connecting member may be fixing or adjustable. In some embodiments, the connecting member provides a support for the spherical structure for ensuring a smooth mating between the spherical structure and the groove of the second protrusion.

In some embodiments, the spherical structure may provide a plurality of tilt angles to provide a basis for turning the turning structure. In some embodiments, a spherical component of the first protrusion 211, when connected to the groove in the second protrusion 212, may change the angle at which two marker pens are connected and ensure a solid connection.

In some embodiments of the present disclosure, two or more marker pens may be flexibly connected through the first extension section of the protrusions, the second extension section of the protrusions, and the turning structure of the protrusions, and a connection angle between the two or more marker pens may be adjusted to make splicing between different marker pens more convenient and varied.

Figure 11:
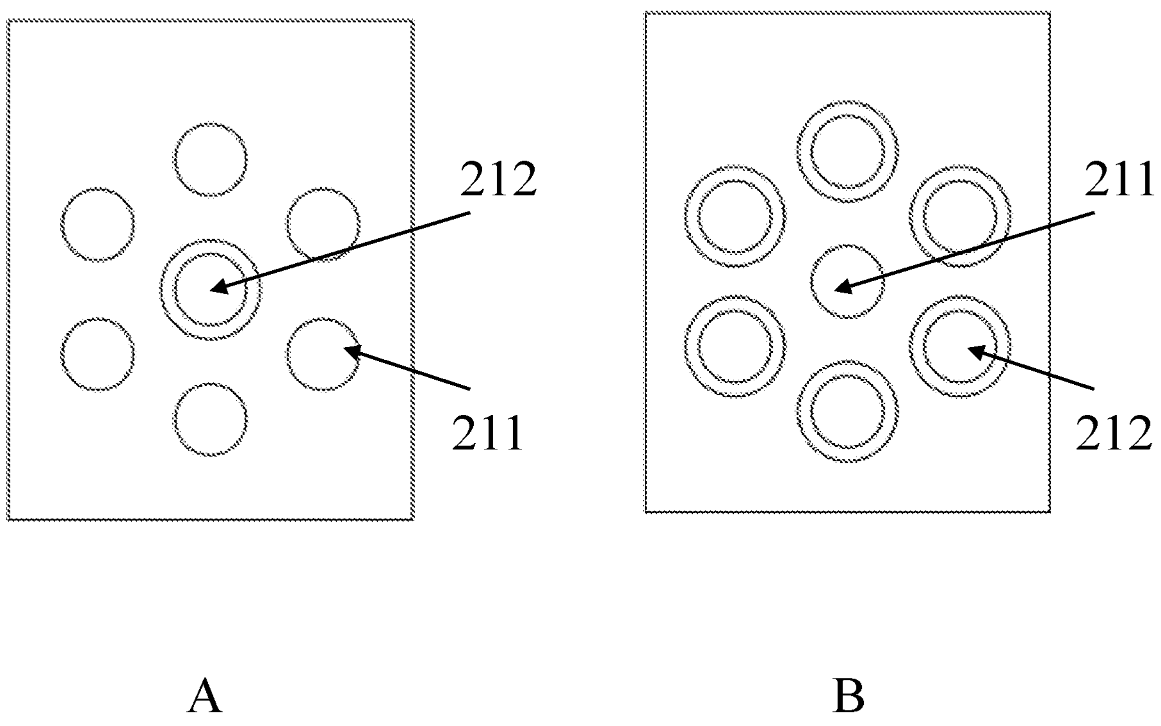
FIG. 11 is a schematic diagram illustrating an arrangement of protrusions according to some embodiments of the present disclosure.

FIG. 11 is a schematic diagram illustrating an arrangement of protrusions according to some embodiments of the present disclosure.

As shown in FIG. 11, in some embodiments, the protrusions on either side surface of the four side surfaces or the top surface of the pen cap of the marker pen may include a first protrusion 211 and the plurality of second protrusions 212, and the plurality of protrusions 212 are evenly distributed around the first protrusion 211 with the first protrusion 211 as a center.

In some embodiments, the protrusions on either side surface of the four side surfaces or top surface of the pen cap of the marker pen may further include a second protrusion 212 and the plurality of first protrusions 211, and the plurality of first protrusions 211 are evenly distributed around the first protrusion 212 with the first protrusion 212 as the center.

More descriptions regarding any one of four side surfaces or the top surface of the pen cap may be found in FIGS. 3A-3D and the related description thereof. More descriptions regarding the first protrusion and the second protrusion may be found in FIG. 1 and the related descriptions thereof.

In some embodiments, by providing the first protrusion 211 disposed in the center and with the plurality of second protrusions 212 surrounding the first protrusion 211 that are evenly distributed, the two marker pens may be spliced at different angles. For example, when total six second protrusions on one side surface of the pen cap of a marker pen 1 are evenly distributed around the first protrusion A, the second protrusions at a direction of two o'clock and the center first protrusion are selected to be connected to two protrusions of another marker pen 2, so that the marker pen 1 and the marker pen 2 may be formed at an angle of 60°. The unused protrusions may be incorporated into an interior of the pen cap 200 under the action of pressure based on the elastic component 202.

In some embodiments, the protrusions used may be flexibly selected based on desired splicing angle to achieve multiple angles of the splicing and a neat overall appearance of the marker pen.

In some embodiments of the present disclosure, a flexible adjustment of the angle of the marker pen splicing may be realized by adjusting the arrangements of the protrusions, which is not only limited to a parallel splicing or a vertical splicing.

Figure 12:
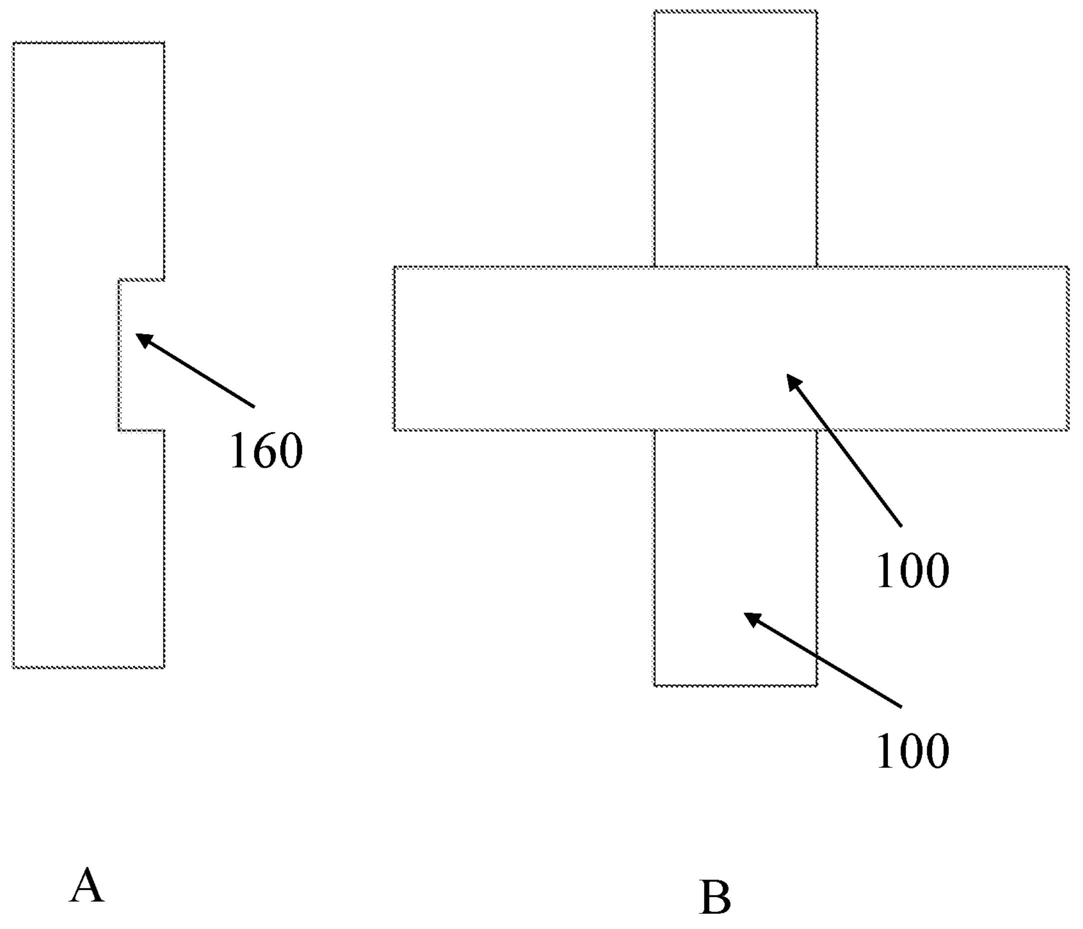
FIG. 12 is a schematic diagram illustrating a fixing slot according to some embodiments of the present disclosure.

FIG. 12 is a schematic diagram illustrating a fixing slot according to some embodiments of the present disclosure.

As shown in FIG. 12, in some embodiments, the body 100 of the marker pen 10 is provided with a fixing slot 160.

The fixing slot 160 is a stripe-shaped slot on the body of the marker pen 10, and a direction of the fixing slot 160 is perpendicular to the axial direction of the marker pen 10. In some embodiments, a depth of the fixing slot may be 3.2 mm to 4.8 mm. By snapping the fixing slots of two marker pens together, the splicing of the bodies of different marker pens may be realized.

In some embodiments, the fixing slot may be provided on a rotatable structure of the body of the marker pen, a change in the direction of the fixing slot may be realized by changing the direction of the rotatable structure, thereby realizing the splicing of the bodies of the two marker pens at different angles.

In some embodiments, the fixing slot may be configured to provide a solid snapping during the splicing of the two marker pens, thereby ensuring that the bodies of the two marker pens may be accurately and stably spliced together.

In some embodiments, there may be a hollowness in a middle of the fixing slot, and the hollowness may provide a storage space for storing small items. For example, the small items may be keys, buttons, etc.

In some embodiments, two or more marker pens are snap-connected through the fixing slot, such that the above hollowness is connected to form an expandable continuous storage space.

In some embodiments of the present disclosure, the function of storage is realized by providing a hollowed fixing slot on the body of the marker pen, which enhances a playability and fun of splicing of the marker pen.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A connectable marker pen, comprising a body and a pen cap; wherein, the pen cap is provided on at least one end of the body;

an exterior of the pen cap is provided with one or more protrusions, and the one or more protrusions include at least one first protrusion and at least one second protrusion; and the at least one second protrusion has a groove that mates with the at least one first protrusion;

wherein both the at least one first protrusion and the at least one second protrusion are provided on at least one surface of the exterior of the pen cap; wherein the pen cap is provided with a limiting structure and a second elastic component;

the limiting structure is configured to control a state of the one or more protrusions; and when the limiting structure is in a non-limiting state, in response to the one or more protrusions being subjected to an action of pressure, the one or more protrusions move along an axial direction of the one or more protrusions under the action of the pressure and such that the second elastic component undergoes an elastic deformation.

2. The marker pen of claim 1, wherein a ratio between a height of the first protrusion and a depth of the groove is 0.5:1 to 1:1.

3. The marker pen of claim 2, wherein the height of the first protrusion is 0.96 mm to 1.44 mm and a diameter of the first protrusion is 2.04 mm to 3.06 mm.

4. The marker pen of claim 1, wherein the pen cap includes a top surface and four side surfaces;

the top surface is provided with a first protrusion and a second protrusion;

each of the four side surfaces is provided with a plurality of first protrusions and a plurality of second protrusions; and a count of protrusions is equal on the each of the four side surfaces, and a count of the first protrusions is equal to a count of the second protrusions.

5. The marker pen of claim 4, wherein the first protrusion and the second protrusion disposed on the top surface are provided along a first symmetry axis of the top surface and are symmetrically distributed relative to a second symmetry axis, and the first symmetry axis is perpendicular to the second symmetry axis.

6. The marker pen of claim 4, wherein for different side surfaces of the four side surfaces, arrangements of the plurality of protrusions are different; and for each side surface of the four side surfaces, there exists an arrangement on another identical pen cap that mates with the pen cap.

7. The marker pen of claim 6, wherein the plurality of protrusions are arranged in a dotted pattern, and a distance between center points of two adjacent protrusions in a vertical direction or a horizontal direction is 4.8 mm to 7.2 mm.

8. The marker pen of claim 4, wherein an edge of the top surface has a cylindrical protrusion.

9. The marker pen of claim 8, wherein an outer side surface of the cylindrical protrusion and an edge shape of the top surface are different.

10. The marker pen of claim 1, wherein the pen cap is provided with a turntable, and the one or more protrusions are provided on the turntable.

11. The marker pen of claim 1, wherein the one or more protrusions include at least three protrusions, the at least three protrusions have at least three extension directions, and the at least three extension directions include an x-axis direction, a y-axis direction, and a non-coordinate axial direction; and the x-axis direction refers to a direction that is perpendicular to an axial direction of the marker pen, the y-axis direction refers to a direction that is parallel to the axial direction of the marker pen, and the non-coordinate axis direction is not perpendicular to either the x-axis direction or the y-axis direction.

12. The marker pen of claim 11, wherein at least one protrusion extending along the y-axis direction mates with at least one protrusion extending along the non-coordinate axial direction.

13. The marker pen of claim 11, wherein at least one protrusion extending along the x-axis direction includes the first protrusion and the second protrusion, and the first protrusion and the second protrusion are disposed opposite to each other.

14. The marker pen of claim 1, wherein a first elastic component is provided within the body configured to adjust a length of the body.

15. The marker pen of claim 1, wherein the one or more protrusions includes a first extension section, a second extension section, and a turning structure, the first extension section and the second extension section are rotatably connected by the turning structure, and extending directions of the first extension section and the second extension section are different.

16. The marker pen of claim 1, wherein the pen cap includes a top surface and four side surfaces, each of the four side surfaces or the top surface include a first protrusion and a plurality of second protrusions, the plurality of second protrusions are evenly distributed around the first protrusion with the first protrusion as a center.

17. The marker pen of claim 1, wherein the body is provided with a fixing slot.

18. The marker pen of claim 17, wherein a middle of the fixing slot is hollowed out to form a storage space; and at least one marker pen is snap-connected through the fixing slot to form a continuous storage space.

19. The marker pen of claim 1, wherein the one or more protrusions are made of a material that has a certain elasticity, and the at least one first protrusion is mated with the groove by an interference fit.

20. The marker pen of claim 1, wherein the pen cap includes at least a portion of a spherical surface, and the one or more protrusions are provided in a radial direction along the spherical surface.

* * * * *